(12) United States Patent
Elo

(10) Patent No.: US 8,928,275 B2
(45) Date of Patent: Jan. 6, 2015

(54) WIRELESS ENERGY TRANSFER

(75) Inventor: Harri Heikki Elo, Helsinki (FI)

(73) Assignee: Nokia Corporation, Espoo (FI)

( * ) Notice: Subject to any disclaimer, the term of this patent is extended or adjusted under 35 U.S.C. 154(b) by 527 days.

(21) Appl. No.: 12/809,141

(22) PCT Filed: Dec. 10, 2008

(86) PCT No.: PCT/EP2008/010860
§ 371 (c)(1),
(2), (4) Date: Jun. 18, 2010

(87) PCT Pub. No.: WO2009/077195
PCT Pub. Date: Jun. 25, 2009

(65) Prior Publication Data
US 2010/0289449 A1   Nov. 18, 2010

Related U.S. Application Data

(63) Continuation-in-part of application No. 11/960,072, filed on Dec. 19, 2007, now abandoned.

(51) Int. Cl.
H02J 7/00 (2006.01)
H02J 5/00 (2006.01)
H01F 38/14 (2006.01)

(52) U.S. Cl.
CPC ........ *H02J 5/005* (2013.01); *H01F 38/14* (2013.01)
USPC ............................. 320/108; 320/109; 307/104

(58) Field of Classification Search
USPC .................. 320/108, 109, 132, 139; 307/106
See application file for complete search history.

(56) References Cited

U.S. PATENT DOCUMENTS

| 5,949,155 | A  | * | 9/1999  | Tamura et al. ............... 307/107 |
| 6,118,249 | A  | * | 9/2000  | Brockmann et al. ......... 320/108 |
| 6,154,005 | A  | * | 11/2000 | Hyogo et al. ................. 320/108 |
| 6,184,651 | B1 | * | 2/2001  | Fernandez et al. ........... 320/108 |
| 6,844,702 | B2 | * | 1/2005  | Giannopoulos et al. ...... 320/108 |
| 7,208,912 | B2 | * | 4/2007  | Ghabra et al. ................ 320/108 |
| 7,211,986 | B1 | * | 5/2007  | Flowerdew et al. .......... 320/108 |
| 2002/0089305 | A1 | * | 7/2002 | Park et al. ..................... 320/108 |
| 2004/0145342 | A1 | * | 7/2004 | Lyon ............................. 320/108 |
| 2005/0189910 | A1 | * | 9/2005 | Hui ............................... 320/108 |
| 2006/0071632 | A1 |   | 4/2006 | Ghabra et al. |
| 2007/0145830 | A1 | * | 6/2007 | Lee et al. ...................... 307/135 |

FOREIGN PATENT DOCUMENTS

| EP | 0 609 964 | 8/1994 |   |
| GB | 2 399 228 | 9/2004 |   |
| JP | 10012467 | 1/1998 |   |
| JP | 10174206 | 6/1998 |   |
| WO | WO 94/28560 | * 12/1994 | ............ H01F 23/00 |
| WO | WO 9428560 | 12/1994 |   |
| WO | WO9428560 | 12/1994 |   |
| WO | WO 2004073166 | 8/2004 |   |

OTHER PUBLICATIONS

International Search Report of PCT/EP2008/010860—Date of Completion of Search: Apr. 23, 2009.

* cited by examiner

*Primary Examiner* — Yalkew Fantu
(74) *Attorney, Agent, or Firm* — Locke Lord LLP

(57) ABSTRACT

An apparatus (200) comprising monitoring circuitry (230) configured to monitor a resonant frequency of a supply source (100), a receiving component (211*a*), and a control unit (220) configured to vary a resonant frequency of said receiving component (211*a*), wherein the apparatus (200) is configured to vary the resonant frequency of said receiving component (211*a*) in dependence upon the resonant frequency of said supply source (100).

28 Claims, 14 Drawing Sheets

WIRELESS ENERGY TRANSFER

RELATED APPLICATIONS

This application is a continuation-in-part of U.S. application Ser. No. 11/960,072, titled "Wireless Energy Transfer", filed Dec. 19, 2007 now abandoned, which is hereby incorporated by reference in its entirety.

PCT filed application entering national stage was described and claimed in International Application No. PCT/EP2008/010860 filed on Dec. 18, 2008.

FIELD OF THE INVENTION

The present invention relates to wireless energy transfer, particularly, but not exclusively, to wireless energy transfer between a supply source and a receiving component.

BACKGROUND TO THE INVENTION

It is common practice for a portable electronic device, for example a mobile telephone or a laptop computer, to be powered by a rechargeable chemical battery. Generally speaking, such a battery is releasably connected to the body of a portable device.

The use of a battery for supplying power to a portable electronic device is not ideal because the energy storage capacity of a chemical battery is limited. As such, it is necessary for the chemical battery to be recharged at regular intervals.

In order to provide a means for recharging the battery, the portable device is normally supplied with a charger unit to allow electrical energy to flow from a mains power supply to the rechargeable battery. The charger unit conventionally comprises an electrical plug for connecting to a mains power supply socket and an electrical cable for connecting the electrical plug to the portable device.

This is disadvantageous because, if there is no convenient mains power supply socket, as is the case in most outdoor and public environments, the rechargeable battery will run out of power and the portable device will need to be switched off.

The use of such a charger unit is further disadvantageous in that it requires a physical connection between the portable device and a mains power supply socket. This severely restricts the movement of the portable device during charging, thereby negating the portability of the device.

Another type of charger unit makes use of the principle of conventional, short-range inductive coupling, which involves the transfer of energy from a primary inductor in a charger unit to a secondary inductor in the portable device. Such charger units are commonly used, for example, for charging rechargeable batteries in electric toothbrushes.

Chargers utilising this type of conventional inductive coupling are able to transfer power wirelessly and hence do not require a physical connection between the mains supply and the portable device. However, the maximum distance over which effective power transfer can be achieved is limited to distances of the same order of magnitude as the physical dimensions of the inductors. For portable electronic devices, the dimensions of the inductor are limited by the size of the portable electronic device. Accordingly, in general, at distances of anything greater than a few centimeters, the efficiency of energy transfer between primary and secondary inductors is too small for this type of power transfer to be viable.

Therefore, as with the electrical cable discussed above, power transfer using conventional inductive coupling requires the charger unit and the portable device to be in very close proximity, meaning that the movement of the portable device is severely restricted.

In addition to the above problems associated with recharging, the use of a chemical battery as a power supply presents a number of further disadvantages. For example, rechargeable chemical batteries have a limited lifespan and tend to experience a decrease in their maximum storage capacity as they get older. Furthermore, chemical batteries are relatively heavy, meaning that the inclusion of a chemical battery in a portable device generally adds a significant percentage to the device's overall weight. If the device's reliance on the chemical battery could be reduced, then it would be possible for portable electronic devices such as mobile telephones to become significantly lighter.

SUMMARY OF THE INVENTION

This specification describes an apparatus comprising monitoring circuitry configured to monitor a resonant frequency of a supply source, a receiving component, and a control unit configured to vary a resonant frequency of said receiving component, wherein the apparatus is configured to vary the resonant frequency of said receiving component in dependence upon the resonant frequency of said supply source The receiving component may be adapted to receive energy wirelessly from the supply source by resonant inductive coupling.

The receiving component may comprise an adaptive receiving component having a variable resonant frequency.

The apparatus may be configured to match the resonant frequency of said receiving component with the resonant frequency of said supply source.

A voltage may be induced in the receiving component by a magnetic field generated by the supply source, and the control unit may be configured to vary the resonant frequency of the receiving component to match the resonant frequency of the supply source.

The apparatus may further comprise a plurality of electrical components, and the apparatus may be configured to supply electrical energy to at least one of these electrical components.

The apparatus may further comprise a battery for supplying electrical energy to at least one of the electrical components when energy is not being received from the supply source.

The apparatus may comprise a portable electronic device.

The apparatus may comprise a mobile telephone, personal digital assistant (PDA) or laptop computer.

The apparatus may comprise a phase locked loop circuit configured to output a control signal for varying the resonant frequency of the receiving component in dependence upon the resonant frequency of the supply source.

This specification further describes an apparatus comprising means for detecting a presence of a supply source, means for monitoring a resonant frequency of said supply source, and means for varying a resonant frequency of a receiving component in dependence upon the resonant frequency of said supply source.

The receiving component may be configured to receive electrical energy by wireless non-radiative energy transfer from the supply source and may be configured to supply the received electrical energy to a rechargeable battery.

This specification further describes an apparatus comprising a receiving component having variable resonance characteristics for receiving energy wirelessly from a supply source, wherein the resonance characteristics of the receiving component may be varied to match resonance characteristics of the supply source to increase the efficiency at which energy is received from the supply source.

The apparatus may further comprise monitoring circuitry for detecting and monitoring the resonance characteristics of the supply source.

The receiving component of the apparatus may comprise an adaptive receiving component having variable resonance characteristics and the apparatus may further comprise a control unit configured to automatically vary the resonance characteristics of the adaptive receiving component to match the resonance characteristics of the supply source.

The apparatus may further comprise one or more electrical components and the receiving component may be coupled to power supply circuitry to supply power to at least one of these electrical components.

The apparatus may further comprise a battery for supplying electrical energy to at least one of the electrical components when energy is not being received from the supply source.

The apparatus may comprise a portable electronic device.

The apparatus may comprise a mobile telephone, personal digital assistant (PDA) or laptop computer.

The apparatus comprise a phase locked loop circuit configured to output a control signal for varying the resonant frequency of the receiving component in dependence of the resonant frequency of the supply source.

This specification further describes a system comprising a supply source, and an apparatus comprising monitoring circuitry configured to monitor a resonant frequency of the supply source, a receiving component, and a control unit configured to vary a resonant frequency of said receiving component, wherein the apparatus is configured to vary the resonant frequency of said receiving component in dependence upon the resonant frequency of said supply source.

This specification further describes a method comprising detecting a presence of a supply source, monitoring a resonant frequency of said supply source, and varying a resonant frequency of a receiving component in dependence upon the resonant frequency of said supply source.

The method may further comprise outputting a control signal from a phase locked loop circuit for varying the resonant frequency of the receiving component in dependence upon the resonant frequency of the supply source, and matching the resonant frequency of said receiving component with the resonant frequency of said supply source.

The method may further comprise receiving energy wirelessly at the receiving component from the supply source by resonant inductive coupling.

The receiving component may comprise an adaptive receiving component having a variable resonant frequency and the method may further comprise inducing a voltage in the adaptive receiving component using a magnetic field generated by the supply source, and varying the resonant frequency of the adaptive receiving component to match the resonant frequency of the supply source.

The method may further comprise supplying electrical energy to an electrical apparatus.

The method may further comprise supplying energy to at least one component of an electrical device from a battery when energy is not being received at the receiving component from the supply source.

The method may further comprise receiving energy at the receiving component from the supply source by resonant inductive coupling, and supplying energy received by resonant inductive coupling to at least one component of an electrical device.

This specification further describes a computer program stored on a storage-medium which, when executed by a processor, is arranged to perform a method comprising detecting a presence of a supply source, monitoring a resonant frequency of said supply source, and varying a resonant frequency of a receiving component in dependence of the resonant frequency of said supply source.

BRIEF DESCRIPTION OF THE DRAWINGS

In order that the invention may be more fully understood, embodiments thereof will now be described by way of illustrative example with reference to the accompanying drawings in which.

DETAILED DESCRIPTION OF THE PREFERRED EMBODIMENTS

Figure 1:
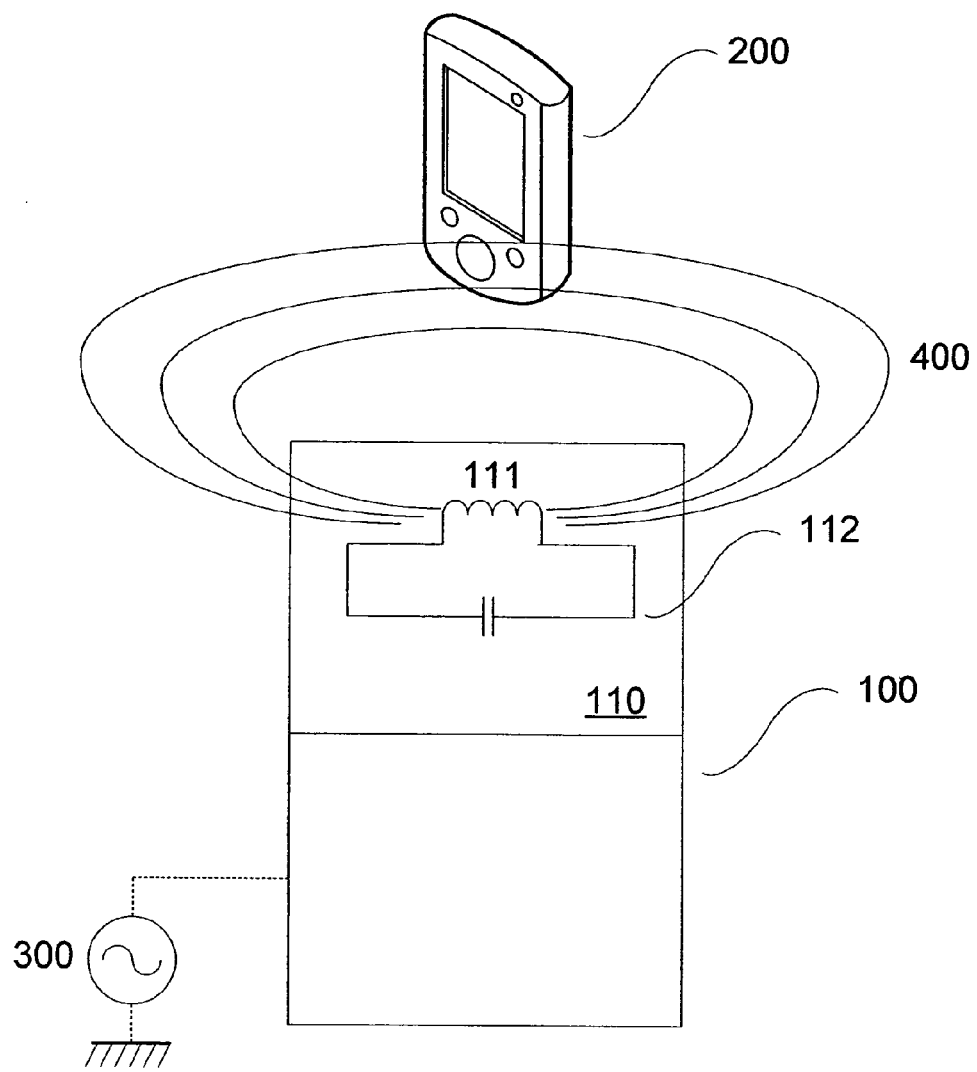
FIG. 1 is a diagram showing a flow of energy from a feeding device to a portable electronic device.

Referring to FIG. 1, a feeding device 100 comprises a supply source 110 for supplying power wirelessly to a portable electronic device 200. The supply source 110 comprises a primary reactance, for example comprising a primary inductor 111, coupled to an electrical circuit 112. The electrical circuit 112 may be optionally connected to a power supply, for example comprising a mains power supply 300, for supplying electrical current to the electrical circuit 112.

The primary inductor 111 has an inductance $L_{111}$, Q-factor $Q_{111}$ and resonant frequency $f_{0(111)}$.

As will be understood by a skilled person, a flow of electrical current through the primary inductor 111 causes a magnetic field 400 to be created around the primary inductor 111. As is shown by FIG. 1, the evanescent magnetic field 400 created around the inductor 111 penetrates the exterior of the feeding device 100, meaning that the effects of the magnetic field 400 may be experienced in the surrounding environment. For instance, the magnetic field 400 may be used to induce a voltage in a receiving component comprising a secondary reactance, such as a secondary inductor in an electrical device. This is the principle upon which wireless non-radiative energy transfer through conventional short-range inductive coupling is based. However, efficient wireless energy transfer by such conventional short-range inductive coupling is limited to distances of the same order of magnitude as the physical dimensions of the inductors involved in the energy transfer.

As is fully described below, the portable electronic device 200 is adapted to receive energy wirelessly by an alternative type of inductive coupling. This alternative type of inductive coupling will be referred to as resonant inductive coupling.

Using resonant inductive coupling, it is possible to use non-radiative energy transfer to transfer energy efficiently over longer distances than over those possible with conventional inductive coupling. This means that resonant inductive coupling provides a greater degree of freedom and flexibility than conventional inductive coupling when used for the transfer of energy. As is described in more detail below, resonant inductive coupling is based on inductive coupling between a supply source and a receiving component that contain inductors critically tuned to the same frequency. The inductor at the receiving component may tuned so as to resonate at the frequency of the supply source inductor. For example, the resonant frequency $f_0$ of a supply source and the resonant frequency $f_0$ of a receiving component may be equal to one another.

More specifically, if the resonant frequency $f_0$ associated with a primary reactance, for example the resonant frequency $f_{0(111)}$ associated with the inductor 111 in the feeding device 100, may be equal to the resonant frequency $f_0$ associated with a secondary reactance, for example a receiving component comprising a secondary inductor in a portable electronic device 200, efficient wireless non-radiative energy transfer can be achieved between the primary and secondary reactances at longer ranges than is possible with conventional inductive coupling if the primary reactance is placed in a magnetic field generated around the primary reactance.

For example, wireless energy transfer with an efficiency of tens of percent may be achieved by resonant inductive coupling over distances at least one order of magnitude greater than the physical dimensions of the inductors being used for the transfer.

A general example of non-radiative wireless energy transfer between two inductors by resonant inductive coupling is given below.

Figure 2:
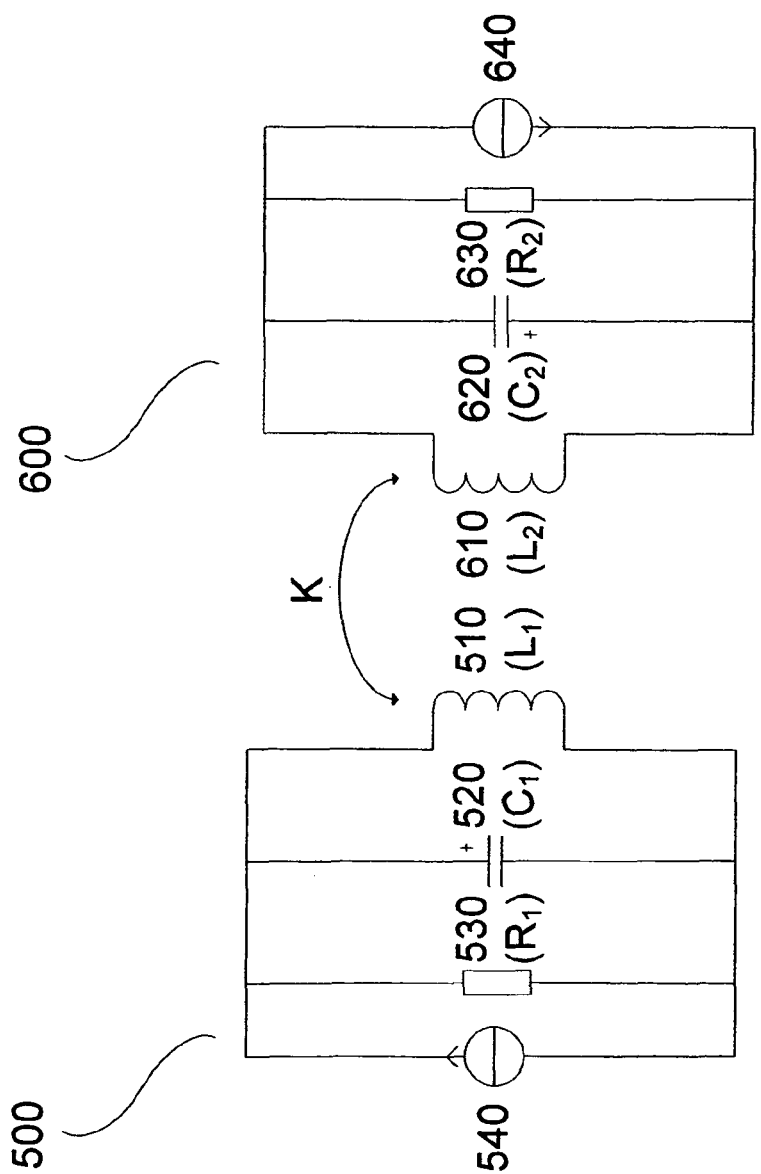
FIG. 2 is a circuit diagram of primary and secondary RLC resonator circuits with coupling coefficient K.

Referring to FIG. 2, there are shown primary and secondary RLC resonator circuits 500, 600. The primary RLC circuit 500 comprises a first inductor ($L_1$) 510, a first capacitor ($C_1$) 520 and a first resistor ($R_1$) 530. The secondary RLC circuit 600 comprises a second inductor ($L_2$) 610, a second capacitor ($C_2$) 620 and a second resistor ($R_2$) 630. In this example, $L_1=L_2$ and $C_1=C_2$.

The primary RLC circuit 500 is connected to a power source, comprising a time-dependent current source ($i_{SUPPLY}(t)$) 540. The time-dependency of the current source 540 is such that the current may take the form of a sine wave, tuned to the resonant frequency $f_0$ of both the first and second RLC circuits 500, 600, i.e.

$$f_0 = \frac{1}{2\pi\sqrt{L_1 C_1}} = \frac{1}{2\pi\sqrt{L_2 C_2}}$$

The second RLC circuit 600 is connected to a load, represented in FIG. 2 as a DC current source ($i_{LOAD}$) 640. The current from the DC current source 640 is zero when energy is not being transferred between the first and second RLC circuits 500, 600.

The Q-values associated with the first and second resonator circuits 500, 600 are represented by the first and second resistors 530, 630. As is explained in more detail below, the magnitude of the Q-values of the resonator circuits 500, 600 is proportional to the efficiency of energy transfer between the circuits 500, 600.

In this general example, the inductors 510, 610 are separated by a distance approximately one order of magnitude greater than the physical dimensions of the inductors 510, 610 themselves. At this range, the coupling coefficient K between the inductors 510, 610 is small, for example 0.001 or less, meaning that any attempt to transfer energy between the resonator circuits 500, 600 by conventional inductive coupling would be extremely inefficient. The value of the coupling coefficient K may be given by the equation:

$$K = \frac{M}{\sqrt{L_1 L_2}}$$

where M is the mutual inductance between the resonator circuits 500, 600. The coupling coefficient K has a minimum value of zero and a maximum value of one.

Figure 3:
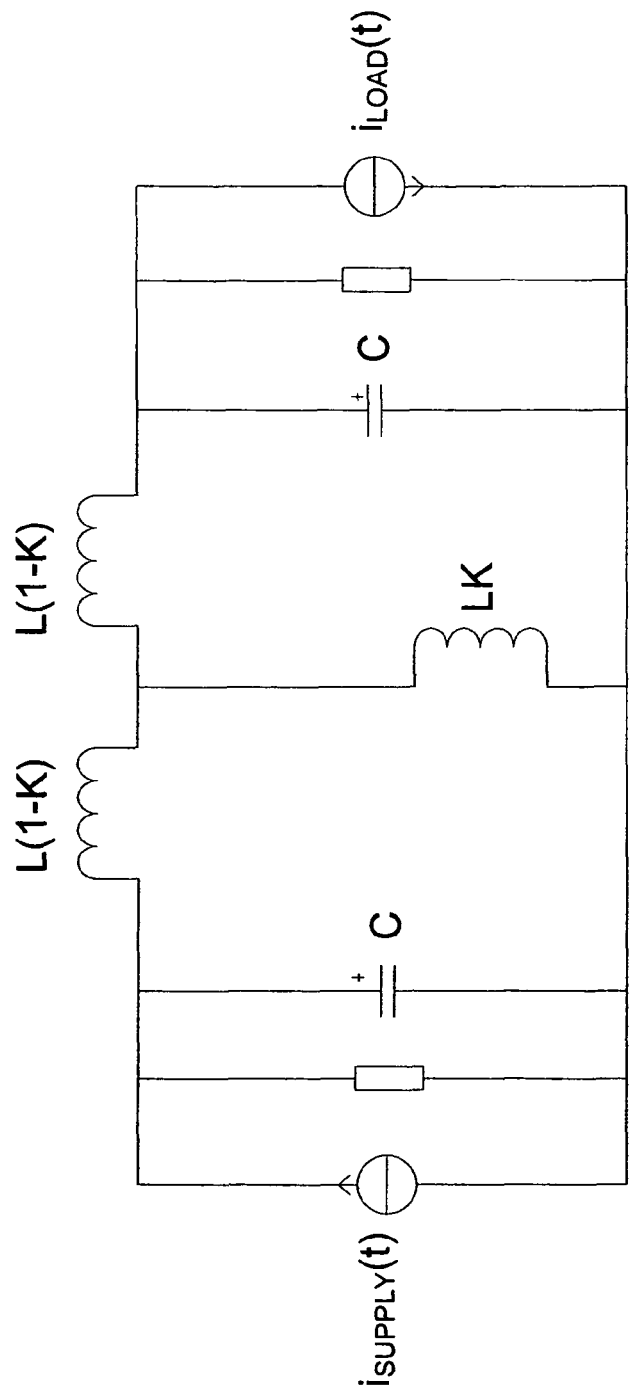
FIG. 3 is a circuit diagram of an equivalent transformer circuit for the first and second RLC resonator circuits shown in FIG. 2.

FIG. 3 shows an equivalent transformer circuit for the first and second RLC resonator circuits 500, 600. When the frequency of the time-dependent current source 540 is not equal to the resonant frequency $f_0$ of the second RLC resonator circuit 600, the second resonator circuit is bypassed due to negligible inductance LK. As such, very little or no power is transferred to the load. However, when the conditions for resonant inductive coupling are met, this situation is reversed as is explained in the example given below.

Figure 4:
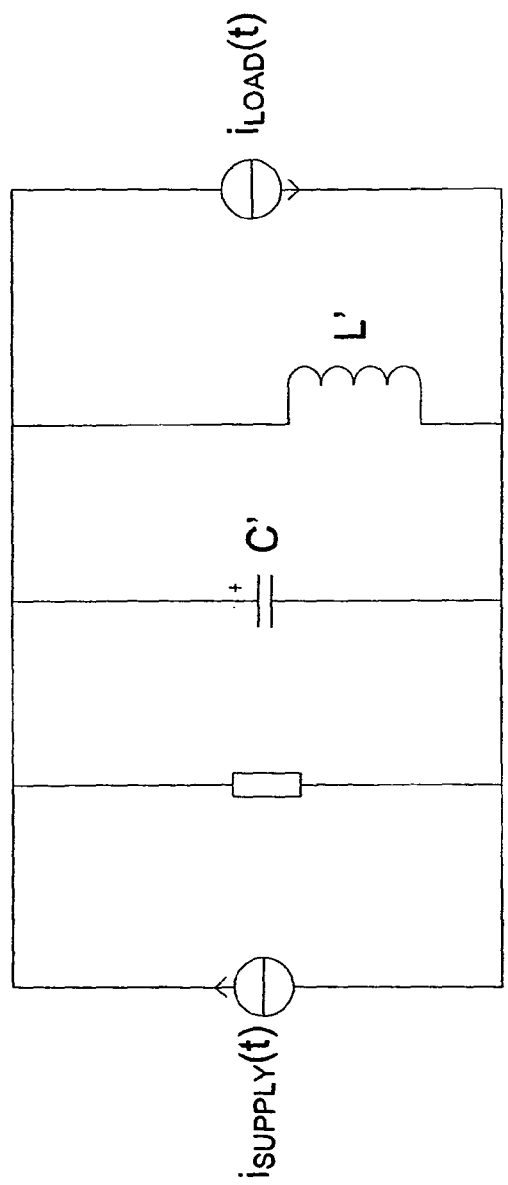
FIG. 4 is a circuit diagram of a reduced circuit of the equivalent transformer circuit shown in FIG. 3.

In one example of energy transfer by resonant inductive coupling, the resonant frequencies $f_0$ of the resonator circuits 500, 600 are equal to one another and the magnitudes of the Q-values (represented by the resistors 530, 630) of the resonator circuits 500, 600 are very high, for example one hundred or more or one thousand or more. When current is supplied by the current source 540 at the resonant frequency $f_0$ of:

$$f_0 = \frac{1}{2\pi\sqrt{L_1 C_1}},$$

current in the first inductor 510 causes an evanescent magnetic field to be generated in the near field around the first inductor 510. This magnetic field is experienced by the second inductor 610 and causes a current to be induced. In this way, current in the first inductor 510 is routed via the second inductor 610. Under these conditions, the inductance LK in the equivalent transformer circuit shown in FIG. 3 is tuned with the secondary resonator circuit. As such, the equivalent transformer circuit shown in FIG. 3 can be reduced to the circuit of a single electrical resonator, as shown by FIG. 4. There is no limit on the number of secondary resonator circuits which could receive current from a primary resonator circuit in this way.

Figure 5:
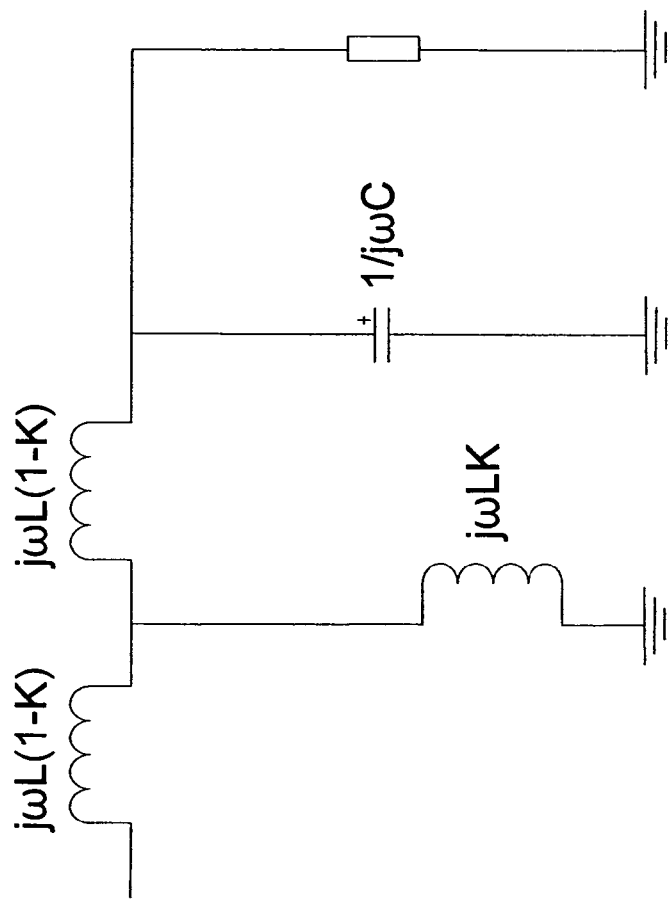
FIG. 5 shows the impedances of the individual components of the equivalent transformer circuit shown in FIG. 3.

The impedances of the individual components of the equivalent transformer circuit shown in FIG. 3 are shown in FIG. 5. The impedance Z of the reduced circuit can thus be calculated as follows:

$$Z = \frac{j\omega LK \cdot Z_{secondary}}{j\omega LK + Z_{secondary}}$$

If the Q-value of the secondary resonator circuit 600 is high, $Z_{secondary}$ may be written as:

$$Z_{secondary} = j\omega L(1-K) + \frac{1}{j\omega C}$$

∴

$$Z = \frac{j\omega LK \cdot \left(j\omega L(1-K) + \frac{1}{j\omega C}\right)}{j\omega LK + \left(j\omega L(1-K) + \frac{1}{j\omega C}\right)}$$

$$= \frac{j\omega LK \cdot (j\omega L(1-K) - j\omega L)}{j\omega LK + (j\omega L(1-K) - j\omega L)}$$

$$= \frac{j\omega LK \cdot (-j\omega LK)}{j\omega LK - j\omega LK}$$

$$\left(\text{where } \frac{1}{j\omega C} = -j\omega L \text{ at resonance}\right)$$

∴ $|Z| \to \infty$ as the conditions for resonant inductive coupling are reached.

A secondary resonator circuit may therefore be tuned so as to receive energy by resonant inductive coupling from any primary resonator circuit.

Figure 6:
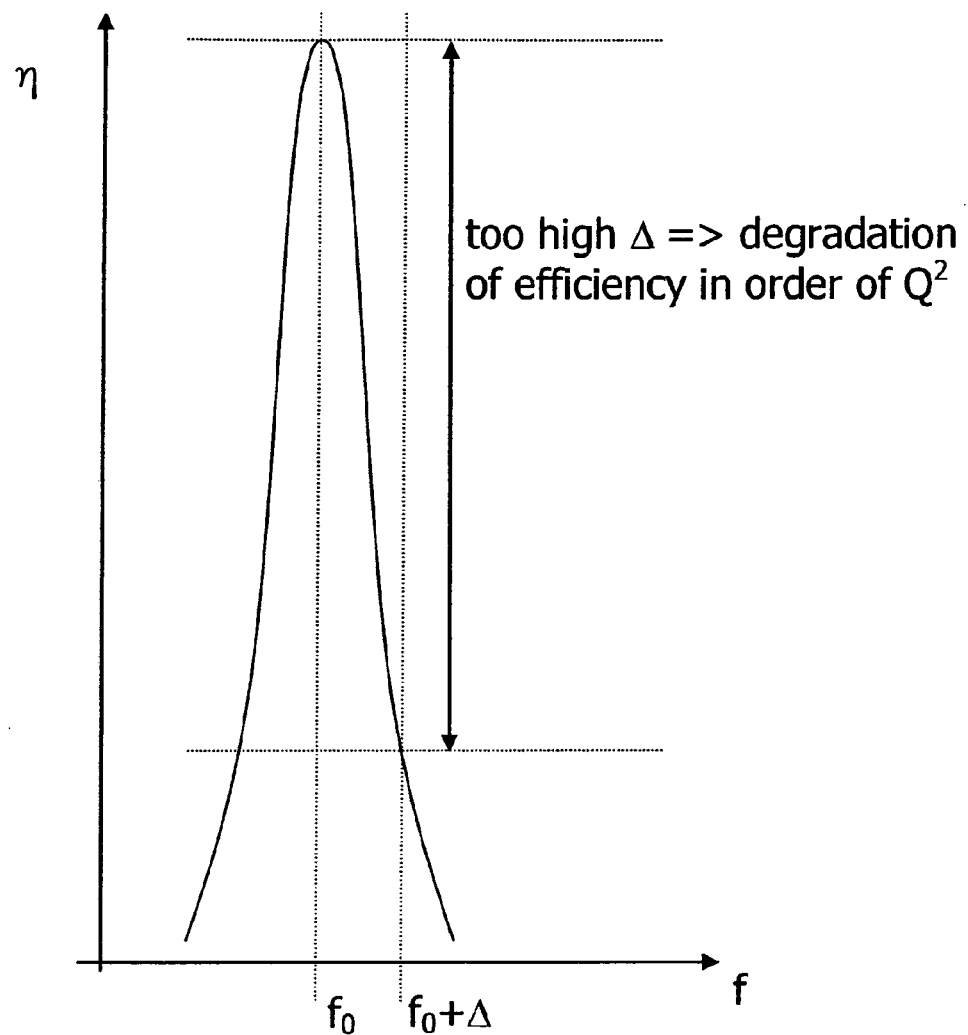
FIG. 6 is a graphical illustration of the relationship between the efficiency of power transfer between two resonators and the difference between the resonators' resonant frequencies.

FIG. 6 illustrates a general relationship between the efficiency of wireless energy transfer η through inductive coupling between primary and secondary reactances separated by a distance one order of magnitude larger than the physical dimensions of the reactances. The efficiency of wireless energy transfer η is plotted on the vertical axis using a logarithmic scale, and the difference in resonant frequency $f_0$ between the reactances is plotted on the horizontal axis. This relationship is applicable to, for example, non-radiative wireless energy transfer between the primary inductor 111 of the feeding device 100 and a secondary inductor 211 of a portable device 200 shown in FIG. 7.

As can be seen, the efficiency of non-radiative wireless energy transfer η between the reactances is at a maximum when the resonant frequencies $f_0$ associated with the reactances are equal to one another. Moreover, the efficiency of wireless energy transfer η between the reactances decreases markedly as the difference between the resonant frequencies $f_0$ associated with the reactances increases. Accordingly, as discussed above, in order to transfer energy at the maximum possible efficiency it is preferable for the reactances to have resonant frequencies $f_0$ which are as close to each other as possible. Ideally, the resonant frequencies $f_0$ should be identical.

An optimal regime for efficient energy transfer by resonant inductive coupling may be when the condition $$\frac{K_{12}}{\sqrt{\Gamma_1 \Gamma_2}} \gg 1$$

is satisfied. Here, Γ represents the linewidth of the resonance associated with each of the first and second reactances due to intrinsic losses. The linewidth is inversely proportional to the Q factor, which is a measure of the sharpness of the resonance.

In addition, as previously discussed, the efficiency of energy transfer between primary and secondary reactances is proportional to the magnitude of the Q-values associated with the reactances; for a high efficiency of energy transfer, the magnitude of the Q-values should be large. For example, in the case of the primary and secondary inductors 111, 211 discussed above in relation to the transfer of energy from the feeding device 100 to the portable device 200, efficient energy transfer may be achieved with Q-values $Q_{111}$, $Q_{211}$ in the order of 100 or more. Furthermore, the relative difference between the resonant frequencies $f_{0(111)}$, $f_{0(211)}$ associated with the inductors 111, 211 should be less that the reciprocal of their associated Q-values. At relative differences greater than the reciprocal of the Q-values, the efficiency of energy transfer decreases by $1/Q^2$.

Figure 7:
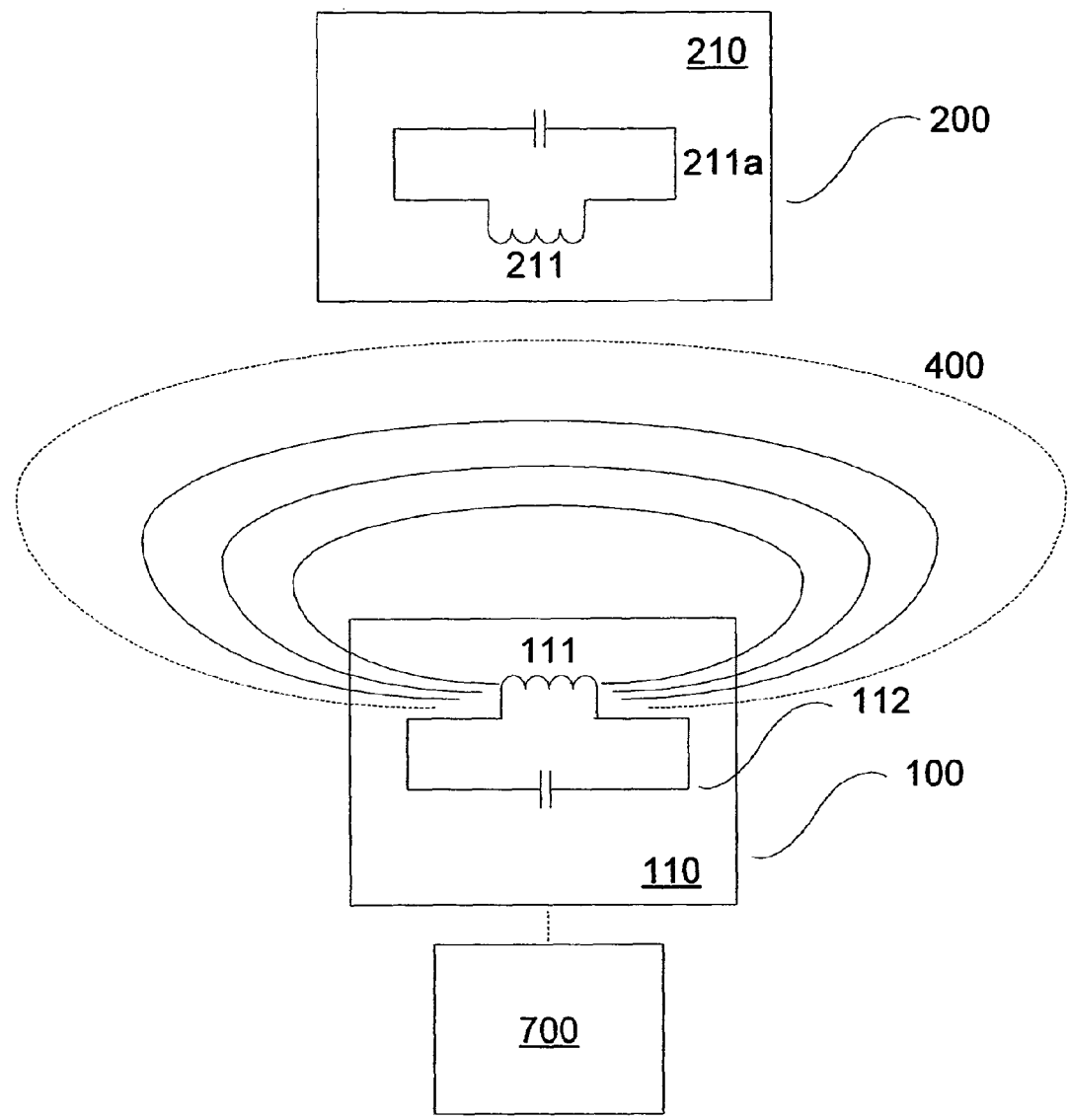
FIG. 7 is an illustration of a wireless transfer of energy from a feeding device to a portable electronic device at mid-range using conventional inductive coupling.
Figure 8:
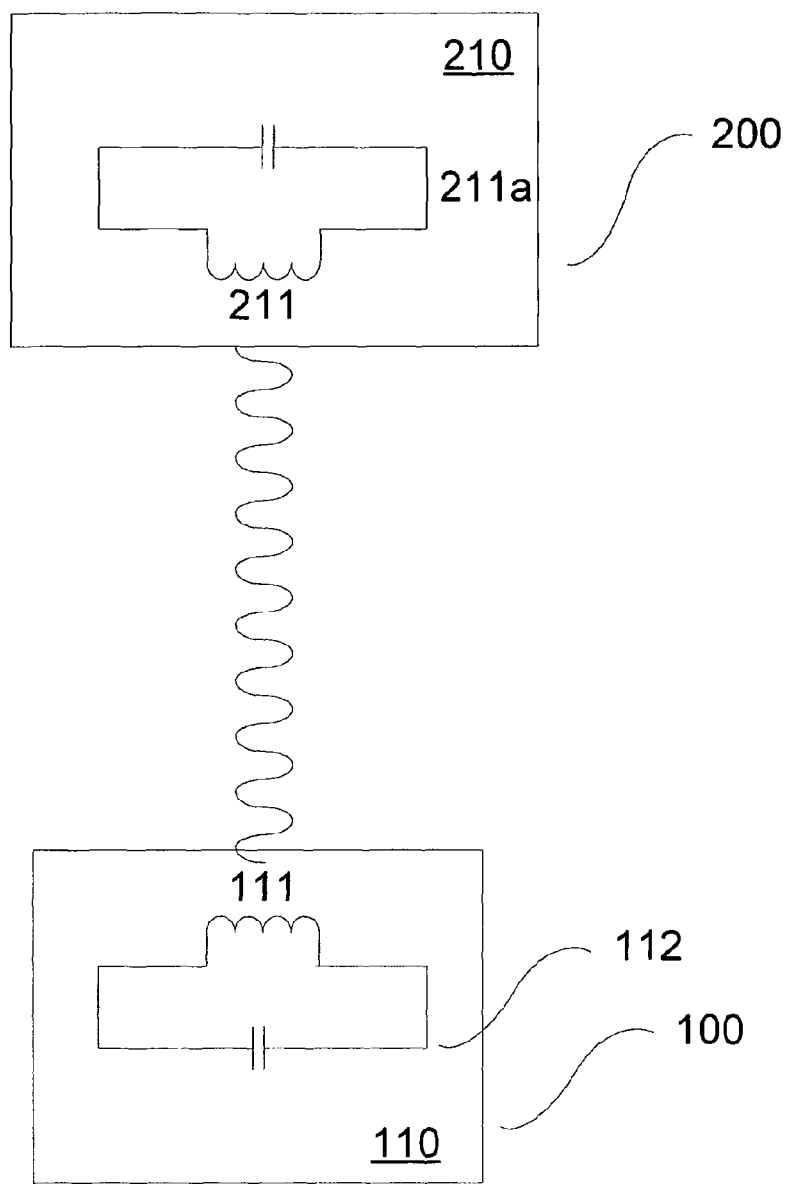
FIG. 8 is an illustration of a wireless transfer of energy from a feeding device to a portable electronic device at mid-range using resonant inductive coupling.

FIGS. 7 and 8 illustrate the difference between conventional inductive coupling and resonant inductive coupling when the distance between reactances, for example the primary and secondary inductors 111, 211, is one order of magnitude greater than the reactances' physical dimensions. Referring to FIG. 7, with conventional inductive coupling, i.e. when the difference between the resonant frequencies associated with the inductors 111, 211 is outside of the limits discussed above, only a negligible amount of energy in the magnetic field 400 is passed from the primary inductor 111 to the secondary inductor 211 in the portable device 200. In contrast, referring to FIG. 8, when the resonant frequencies $f_0$ associated with the inductors 111, 211 are matched, energy is able to tunnel by resonant inductive coupling from the primary inductor 111 in the feeding device 100 to the secondary inductor 211 in the portable electronic device 200 via the magnetic field 400.

For the purposes of simplicity and clarity, the above example discusses the transfer of energy from a primary inductor 111 to a single secondary inductor 211. However, alternatively, energy can be transferred from the primary inductor 111 to a plurality of secondary inductors 211 all being associated with the same resonant frequency $f_0$, potentially enabling multiple portable devices 200 to receive energy wirelessly from a single feeding device 100.

In this way, feeding devices 100 are able to supply energy to portable electronic devices 200 over mid-ranges, for example several meters, in environments in which it is not convenient to install mains power sockets. As an example, in a similar manner to the installation of wireless LANS in café and restaurants, a network 700 of feeding devices 100 could be installed throughout a public space to provide members of the public with a power supply for their portable electronic devices 200. Such a public space could be, for example, a café, restaurant, bar, shopping mall or library. Alternatively, feeding devices may be installed in private spaces such as, for example, the interior of a person's car or home.

In order to maximise the potential of such a network 700 of feeding devices 100, it is preferable that the feeding devices 100 have the capacity to supply energy to as many portable devices 200 as possible. One way in which this could be achieved is to implement a degree of standardization in the properties of the reactances, for example the primary and secondary inductors 111, 211, used in the feeding devices 100 and portable electronic devices 200. In particular, it would be preferable if the resonant frequency $f_0$ associated with the primary reactance in each feeding device 100 of the network 700 was the same. This would enable manufacturers of portable devices 200 and other electrical devices to equip their devices with secondary reactances associated with the same standardized resonant frequency $f_0$.

A skilled person will appreciate, however, that due to manufacturing tolerances, the mass production of inductors to a degree of accuracy in which all the inductors are associated with exactly the same resonant frequency $f_0$ may be difficult to achieve. This will lead to variations in both the resonant frequencies $f_0$ of feeding devices 100, and to variations in the resonant frequencies $f_0$ of portable devices 200. Furthermore, even if feeding devices 100 and portable devices 200 can be manufactured with identical resonant frequencies $f_0$ in free space, the resonant frequencies $f_0$ of each individual unit will be affected when in use by other inductors in the unit's surrounding environment. The amount by which the resonant frequency of each unit is altered will depend on the number and proximity of other inductors.

Thus, even when attempts have been made to standardize the resonant frequencies $f_0$ of feeding devices and portable devices, manufacturing intolerances and environmental conditions still have the potential to cause problems for energy transfer by resonant inductive coupling.

One way to alleviate this problem is to provide portable electronic devices 200 with a wireless energy transfer apparatus 210 for altering the resonant frequency $f_0$ associated with their secondary inductors 211 post-manufacture in dependence of the properties of a nearby feeding device 100. This provides portable electronic devices 200 with the ability to tune their inductor's resonant frequency $f_0$ to match the frequency of an evanescent magnetic field generated around a primary inductor 111 in a nearby feeding device 100 and thus receive energy wirelessly by resonant inductive coupling.

Figure 9:
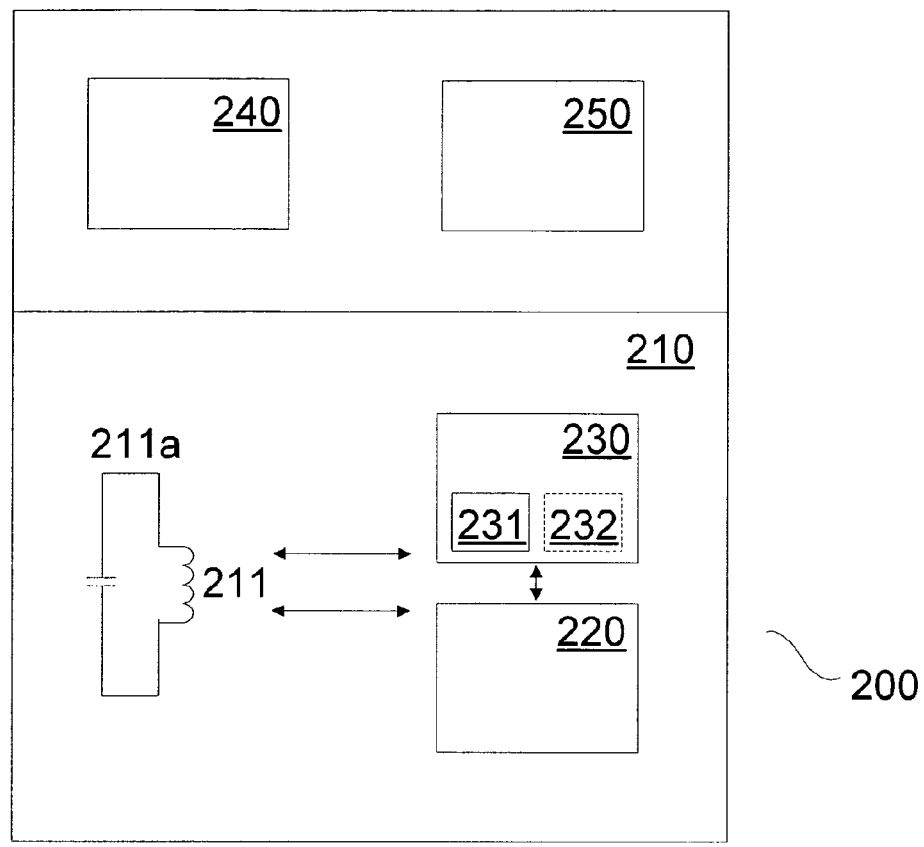
FIG. 9 is a schematic diagram of a portable electronic device, including a reactance and monitoring circuitry.
Figure 9:
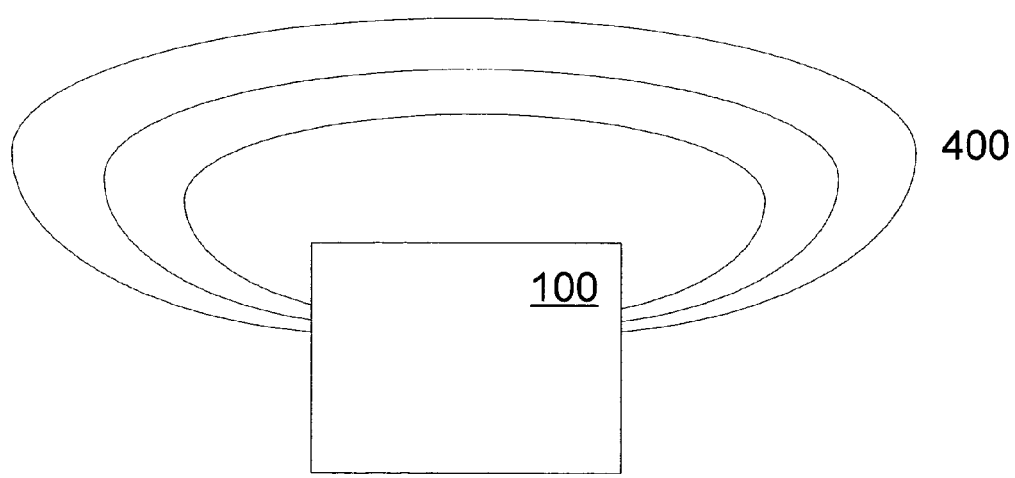

An exemplary embodiment of a portable electronic device 200 adapted to receive energy wirelessly by resonant inductive coupling is given below. Referring to FIG. 9, the portable electronic device 200 comprises a wireless energy transfer apparatus 210, comprising a power supply unit (PSU), for receiving energy from a magnetic field and supplying electrical energy to electrical components 240 of the portable device 200. Alternatively, as discussed below, electrical energy may be supplied to a rechargeable chemical battery 250 of the portable electronic device 200.

In the example discussed below, the magnetic field will be referred to in the context of the magnetic field 400 created by current flowing through the primary inductor 111 in a feeding device 100. However, a skilled person will appreciate that the magnetic field could alternatively correspond to a magnetic field created by another feeding device, or any other suitable magnetic field source.

The wireless energy transfer apparatus 210 may be controlled by a microcontroller 220 integrated into the energy transfer apparatus 210 and may comprise a receiving component 211a, comprising at least one reactance, for receiving energy wirelessly by non-radiative energy transfer from the magnetic field 400 by resonant inductive coupling. More specifically, as discussed above, a voltage may be induced in the receiving component 211a by the magnetic field 400 generated around the primary inductor 111 by an AC voltage applied across the primary inductor 111 at the supply source 110. When the receiving component 211a is coupled to a load in the portable electronic device, electrical power is transmitted from the supply source to the load. Such a load may comprise at least one switch mode power supply, as described with reference to FIG. 10. In this example, the receiving component 211a comprises a secondary inductor 211. The secondary inductor 211 is associated with an inductance $L_{211}$, Q-factor $Q_{211}$ and resonant frequency $f_{0(211)}$.

The wireless energy transfer apparatus 210 may further comprise monitoring circuitry 230 configured to detect a magnetic field 400 created around the primary inductor 111 in the feeding device 100, as is described in more detail below. Upon detecting the magnetic field 400, the monitoring circuitry 230 and microcontroller 220 may be further configured to detect and monitor the resonant frequency $f_{0(111)}$ associated with the primary inductor 111.

The features of the monitoring circuitry 230 allow the portable device 200 to wirelessly receive energy over mid-range distances, for example distances at least one order of magnitude greater than the physical dimensions of the primary and secondary inductors 111, 211.

Figure 10:
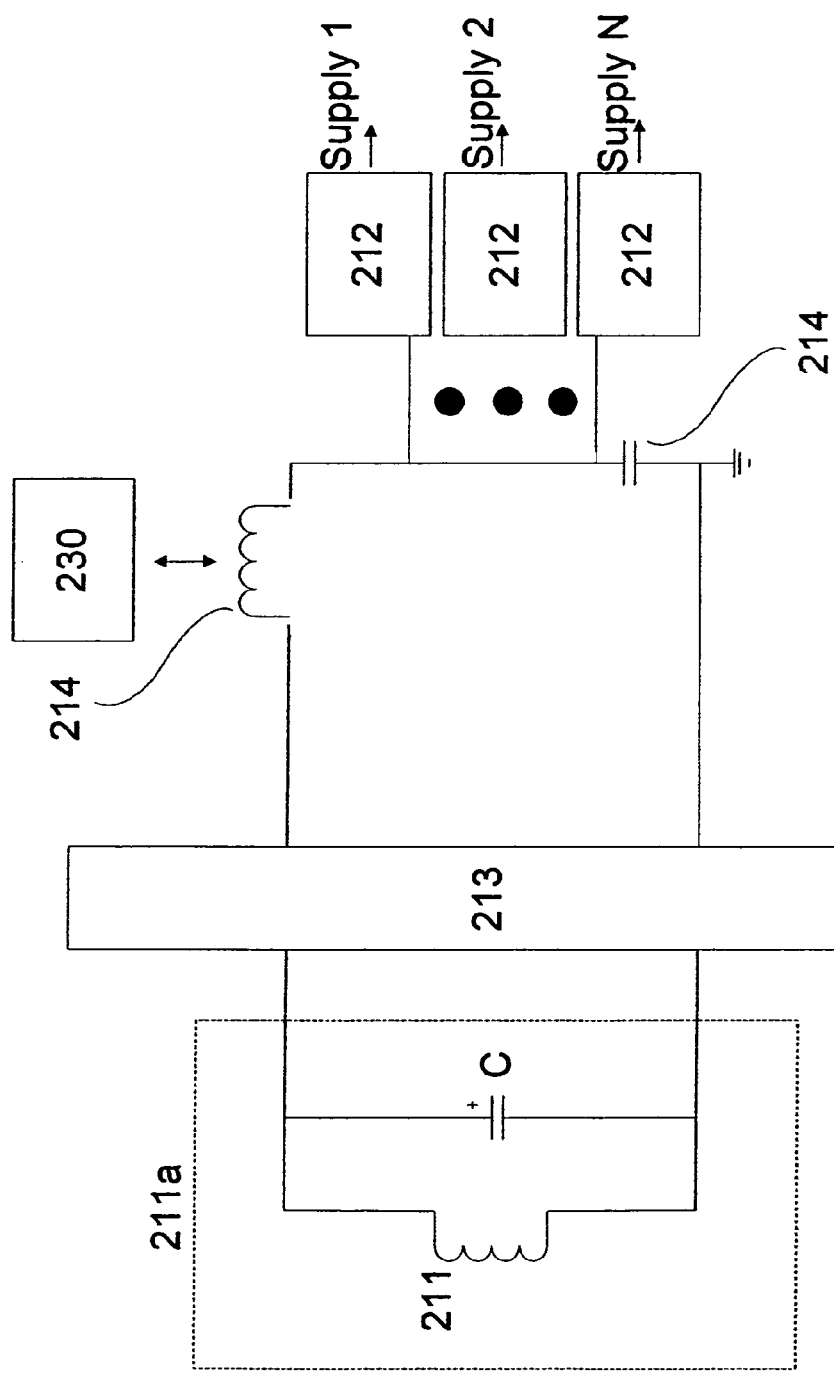
FIG. 10 is a schematic diagram showing components of a wireless power transfer apparatus in a portable electronic device.
Figure 11:
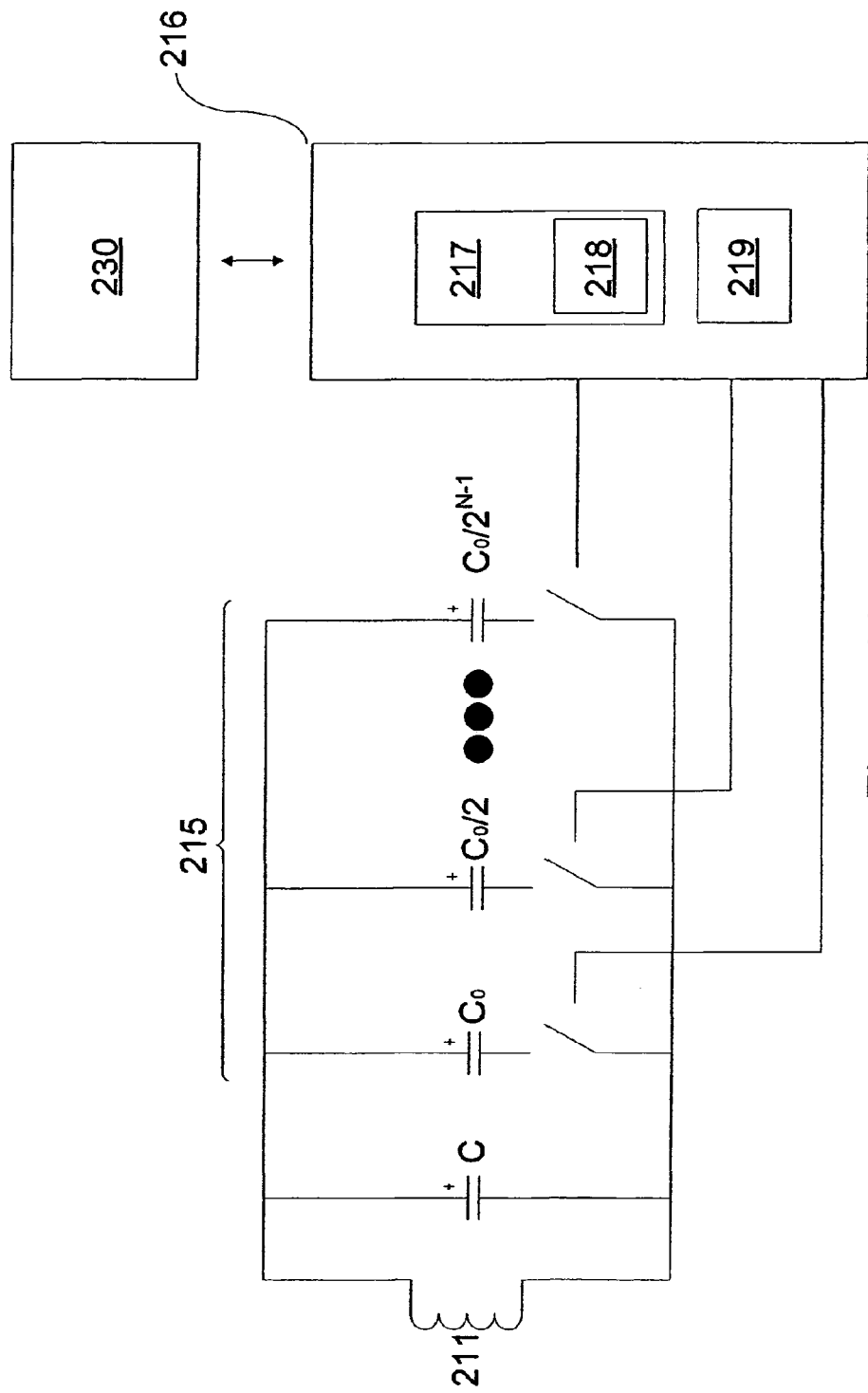
FIG. 11 is a schematic diagram showing an adaptive receiving component in a wireless power transfer apparatus of a portable electronic device.
Figure 13:
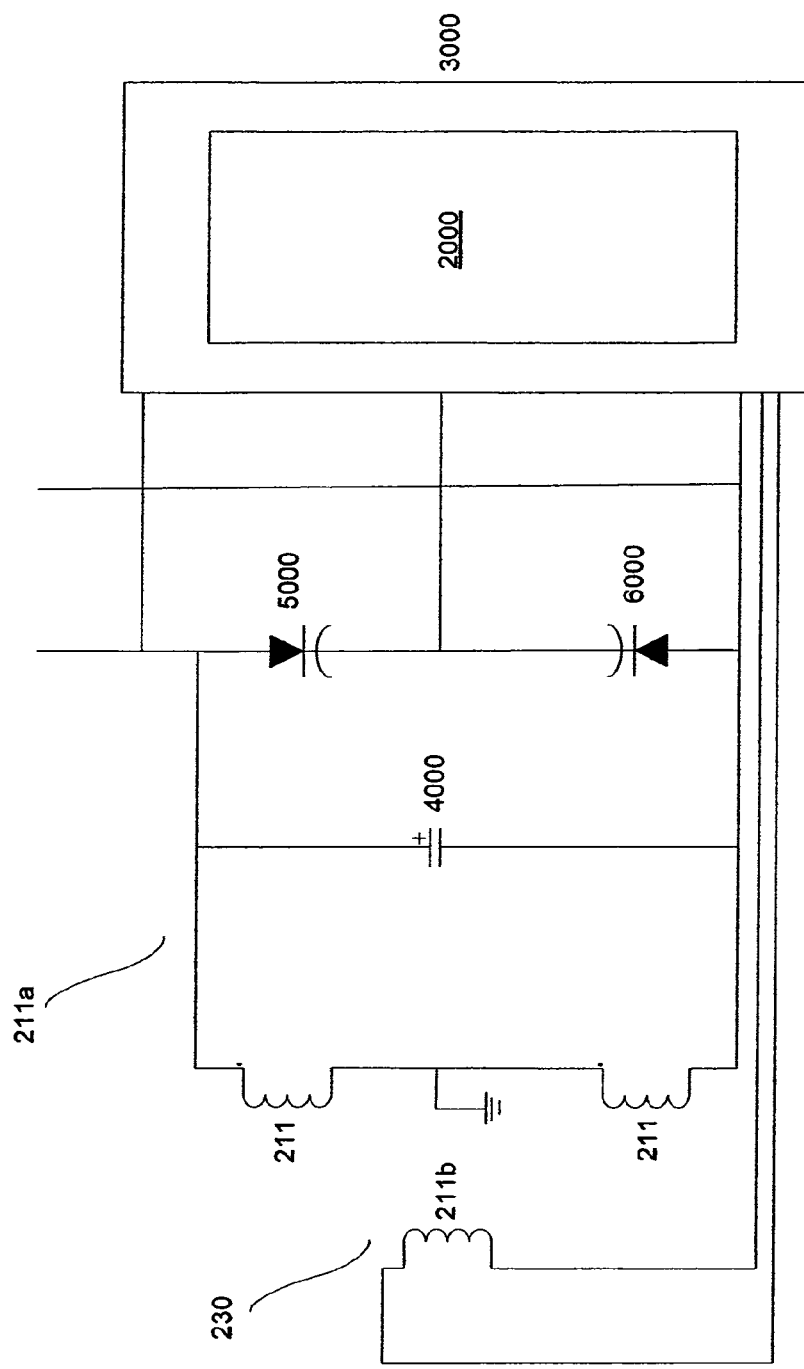
FIG. 13 is a circuit diagram showing an example of an adaptive receiving component and a measurement coil for feeding signals to the PLL ASIC.

Referring to FIG. 10 in combination with FIG. 9, in one example the receiving component 211a of the wireless energy transfer apparatus 210 has a parasitic capacitance C and is connected to a plurality of switched-mode power supplies (SMPSs) 212 via a diode-bridge 213 and LC filter 214. Although the receiving component is shown in FIG. 10 as comprising a single secondary inductor 211, the receiving component 211a is adaptive and may be coupled to or comprise additional components for varying the resonant frequency. Examples of such components are shown in FIGS. 11 and 13. The purpose of the LC filter 214 is to ensure that a constant reactive load is introduced to the secondary inductor 211. If the inductor 211 were to be loaded resistively, there would be a significant decrease in the Q-value $Q_{(211)}$ associated with the inductor 211, which would in turn significantly reduce the efficiency of the transfer of energy from the feeding device 100, as previously discussed.

The diode-bridge 213 and LC filter 214 also protect the inductor 211 from direct exposure to the strongly time-varying load presented by the SMPSs 212, which are configured to supply power received by resonant inductive coupling from the magnetic field 400 to various circuits of the portable electronic device 200. The SMPSs 212 may be configured, for example, to supply power to a rechargeable chemical battery 250 of the portable electronic device 200, as shown in FIG. 9, for recharging.

Alternatively the SMPSs 212 may be configured to supply power directly to electrical components 240 of the portable electronic device 200, with the chemical battery 250 acting as a reserve power source. For example, the chemical battery 250 may be configured only to supply power to electrical components 240 of the portable electronic device 200 when the wireless energy transfer apparatus 210 is not receiving power by resonant inductive coupling. If feeding devices 100 were to become widespread, the inclusion of the rechargeable battery 250 in the portable device 200 could become unnecessary.

FIG. 11 shows an example of an adaptive receiving component 211a. The resonance characteristics of the adaptive receiving component 211a can be tuned to match the resonance characteristics associated with the primary inductor 111 in the feeding device 100. An adaptive receiving component of this type provides the degree of tuneability necessary for the resonant frequency $f_{0(211)}$ of the receiving component 211a to be varied, should the resonant frequency $f_{o(211)}$ not be identical to that associated with the primary inductor 111 in the feeding device 100.

In one example, as is shown by FIG. 11, the receiving component 211a comprises at least one secondary inductor 211 optionally coupled to an array of capacitors 215. Each capacitor 215 may have a different capacitance to each of the others. For example, as shown by FIG. 11, the capacitors 215 may comprise N capacitors with capacitances $C_0, C_0/2 \ldots C_0/2^{N-1}$. Each of the capacitors 215 may be optionally coupled to the secondary inductor 211 to affect the capacitance $C_{211}$ of the receiving component 211a, thereby varying the resonant frequency $f_{o(211)}$ associated with the inductor 211. The connection and disconnection of the capacitors 215 to the secondary inductor 211 provides a mechanism by which the resonant frequency of the receiving component 211a can be varied to match the frequency of the transmitting primary inductor and thus receive energy by resonant inductive coupling. The portable device 200 can therefore match the resonant frequency $f_{o(211)}$ associated with the secondary inductor 211 with the resonant frequency $f_{o(111)}$ associated with the primary inductor 111 in the feeding device 100. It will be appreciated that the resonant frequency $f_{o(211)}$ associated with the secondary inductor 211 could alternatively be varied by altering the inductance of the receiving component 211a.

In this implementation, as is shown by FIG. 11, the array of capacitors 215 is coupled to a control unit 216 in the microcontroller 220 for automatically controlling the capacitance $C_{211}$ of the receiving component 211a in dependence of a control signal from the monitoring circuitry 230. The microcontroller 220 may comprise a memory and signal processing means 217, for example including a microprocessor 218, configured to implement a computer program for detecting and monitoring the resonant frequency associated with the primary inductor 111 through the monitoring circuitry 230 and analysing the control signal from the monitoring circuitry 230 to cause the resonant frequency the resonant frequency associated with the secondary inductor 211 to be varied by connection and disconnection of the individual capacitors in the capacitor array 215.

In this way, the control unit 216 is able to adapt the resonant frequency $f_{o(211)}$ of the receiving component 211a to make it equal to the resonant frequency $f_{o(111)}$ associated with the primary inductor 111, thereby initiating resonant inductive coupling between the primary inductor 111 and the secondary inductor 211.

The monitoring circuitry 230 may be coupled to an output from the LC filter 214 to detect when a voltage is being induced in the secondary inductor 211 and thus to detect when the portable electronic device 200 is in the presence of a magnetic field 400. For example, the output of the LC filter 214 may be coupled to an input of an AD converter 231, which may be integrated into the monitoring circuitry 230, for sensing a voltage induced in the secondary inductor 211 and for supplying a representative signal to the microcontroller 220 for calculating the resonant frequency associated with the primary inductor 111. The resonant frequency associated with the secondary inductor 211 may then be varied by varying the resonant frequency of the adaptive receiving component 211a to match the calculated resonant frequency of the primary inductor 111.

Alternatively, as shown by FIG. 9, the monitoring circuitry 230 may comprise a separate coil 232 for supplying induced voltage signals to the AD converter 231.

The monitoring circuitry 230 may be sensitive to very small voltages induced in the secondary inductor 211, for example of the order of microvolts, and may be configured such that it is able to detect a magnetic field 400 even when the receiving component 211a is in a detuned state. The monitoring circuitry 230 is thus able to detect the presence of a primary inductor 111 even when then the resonant frequency $f_{o(111)}$ associated with the primary inductor 111 is not equal to the resonant frequency $f_{o(211)}$ set for the secondary inductor 211 in the portable electronic device 200.

Figure 12:
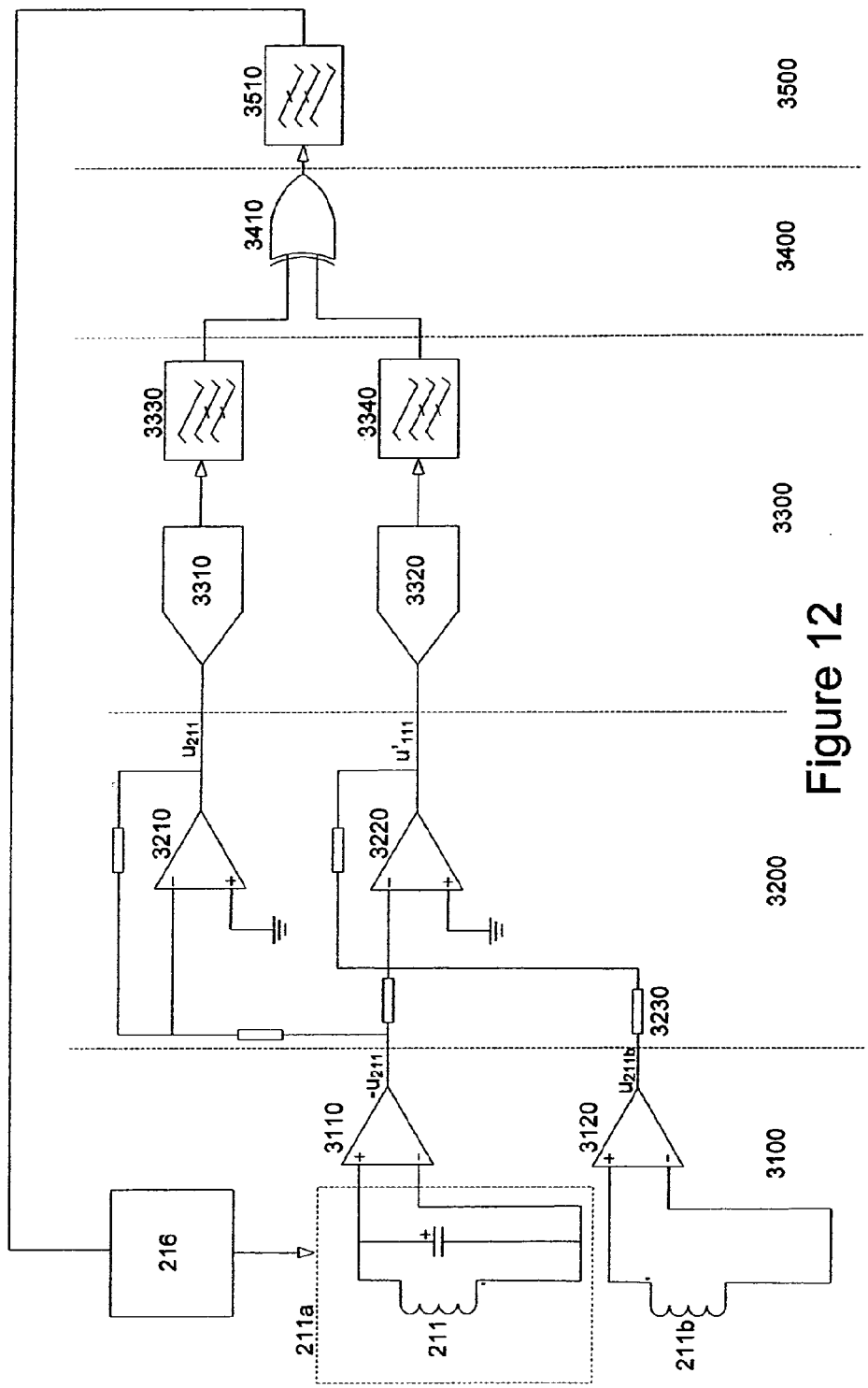
FIG. 12 is a circuit diagram showing an example set of components in a PLL ASIC comprised in a wireless power transfer apparatus of a portable device.

Referring to FIGS. 12 and 13, in one example, the monitoring circuitry 230 is comprised in an application specific integrated circuit (ASIC) 3000 for varying the resonant frequency $f_{o(211)}$ of an adaptive receiving component 211a in dependence of the resonant frequency $f_{o(111)}$ of a supply source 110 comprising a primary inductor 111. In this example, the receiving component 211a may comprise at least one secondary inductor 211, and the monitoring circuitry may comprise a measurement coil 211b. The measurement coil 211b may be external to the ASIC 3000. The measurement coil 211b may have a high impedance value, such that current in the measurement coil 211b is negligible even when the measurement coil 211b is in the presence of a field 400 from a supply source 110. The time varying voltage $u_{211b}$ induced in the measurement coil 211b by a magnetic field generated around a primary inductor 111 in a supply source 110 may be written as follows:

$$u_{211b}(t) = L_{211b} \left[ \frac{K_{211b-111} \cdot u_{111}(t)}{L_{111}} + \frac{K_{211b-211} \cdot u_{211}(t)}{L_{211}} \right]$$

where represents the coupling coefficients between the measurement coil (n) 211b and the primary and secondary inductors (m) 111, 211.

Rearrangement of this equation allows the time varying voltage $u_{211b}$ measured in the measurement coil 211b to be used to calculate the unknown phase of the time varying voltage $u_{111}$ at the primary inductor 111 in the supply source 110, as follows:

$$u'_{111} = u_{111} \left[ \frac{L_{211b} K_{211b-111}}{L_{111}} \right] = u_{211b} - u_{211} \left[ \frac{L_{211b} K_{211b-211}}{L_{211}} \right]$$

where the phase of $u_{111}$ is the same as the phase of the voltage $u_{111}$ at the supply source 110.

The inductance values $L_{211}$ and $L_{211b}$ of the secondary inductor 211 and measurement coil 211b may be measured at the time of manufacture of the portable device 200. As such, by measuring the coupling coefficient between the secondary inductor 211 and the measurement coil 211b (e.g. during manufacture of the portable device 200), the phase of the time varying voltage signal $u_{111}$ at the supply source 110 may be calculated at the portable device 200 despite there being no physical connection between the portable device 200 and the supply source 110. The phase of the voltage signal $u'_{111}$ may then be used to adjust the resonant frequency of the receiving component 211a as described in more detail below. Once measured, the coupling coefficient $K_{211b-211}$ between the secondary inductor 211 and the measurement coil 211b may be stored, for example, in non-volatile memory in the portable device 200 and may be recalled when the portable device 200 is in use.

The voltage signals induced at the secondary inductor 211 and measurement coil 211b due to interaction with the magnetic field 400 may be input to a phase comparator in the portable device 200, which is configured to compare the phase of the voltage u'$_{111}$ (equivalent to the phase of the voltage at the supply source 110) with the phase of the voltage u$_{211}$ at the secondary inductor 211. The phase difference between the voltage signals may be used to adjust the resonant frequency of the receiving component 211a in dependence of the resonant frequency associated with a primary inductor 111 in a supply source 110. This is described in more detail below.

Referring to FIGS. 12 and 13, the portable device 200 may comprise a phase comparator which is part of a phase locked loop (PLL) circuit 2000. The PLL circuit 2000 may be part of the monitoring circuitry 230. The PLL circuit 2000 may be implemented in the application specific integrated circuit 3000, and may be coupled to the control unit 216 for supplying a control signal to the control unit 216 to cause the resonant frequency f$_{o(211)}$ of the receiving component 211a to be varied in dependence of the resonant frequency of the supply source 110. The PLL circuit 2000 allows the resonant frequency of the receiving component 211a to be tuned to match the resonant frequency of the supply source 110 and to be varied in response to any variation in the resonant frequency of the supply source 110. In one example, the control unit 216 is implemented in the ASIC 3000.

As shown in FIG. 12, the ASIC 3000 comprises five functional blocks 3100, 3200, 3300, 3400, 3500. The first block 3100 comprises first and second differential amplifiers 3110, 3120 configured to measure the voltages u$_{211}$, limb induced at the secondary inductor 211 and the measurement coil 211b respectively by a magnetic field 400 generated around the primary inductor 111. The second block 3200 comprises third and fourth differential amplifiers 3210, 3220, which are connected to receive the outputs from the first and second differential amplifiers 3110, 3120. The third and fourth differential amplifiers 3210, 3220 are configured to output the time varying voltage u$_{211}$ at the secondary inductor 211 and the time varying voltage u'$_{(111)}$ respectively. The voltage u'$_{(111)}$ is equivalent in phase to the voltage u$_{(111)}$ at the supply source 110.

At the third block 3300, the signals from the third and fourth differential amplifiers 3210, 3220 are fed to first and second analogue to digital converters (ADC) 3310, 3320, followed by first and second high pass filters 3330, 3340. This strips the DC component from the signal.

The fourth block 3400 comprises the phase comparator 3410, which in this example comprises an exclusive OR gate connected to receive at its inputs the most significant bit (MSB) from each of the high pass filters 3330, 3340. At resonance, e.g. when the resonant frequency f$_{o(211)}$ of the receiving component 211a is equal to the resonant frequency f$_{o(111)}$ of a supply source 110, the phase difference between the voltage u$_{211}$ at the secondary inductor 211 and the voltage u$_{111}$ at the supply source 110 may be $\pi/2$. Therefore, at resonance, the output of the exclusive OR gate 3410 may be high for half of each cycle (i.e. the duty cycle is 50%). This is a convenient equilibrium condition.

The fifth block 3500 comprises a low pass filter 3510, which is connected to receive the output from the phase comparator 3410 at its input and to output a control signal to the control unit 216 for controlling the value of the capacitance of the receiving component 211a, thereby varying the resonant frequency f$_{o(211)}$ of the receiving component 211a in dependence of the resonant frequency of the supply source 110.

For the purposes of clearly showing the components of the PLL circuit 3000, FIG. 12 shows the adaptive receiving component as comprising a single inductor and capacitor. However, the structure of the adaptive receiving component 211a may include or correspond to the receiving components shown in FIGS. 11 and 13. The receiving component may comprise or be coupled to additional components for varying the resonant frequency. Examples of such components are shown in FIGS. 11 and 13. Furthermore, for the purposes of clarity in FIGS. 11 to 13, the couplings between the receiving components 211a and the switched mode power supplies 212 have been omitted. However, it will be appreciated that the receiving components 211a shown in FIGS. 11 to 13 may be coupled to one or more switched mode power supplies 212 for supplying power to electrical components of the portable electronic device, for example as shown in FIG. 10.

In one example, during manufacture of the portable device 200, the input impedance of the second block 3200 is adjusted such that the output of the differential amplifiers 3210, 3220 in the second block 3200 is negligible in the absence of a field 400 from a supply source 110. This may be achieved, for example, by integrating a variable impedance component 3230 as shown in FIG. 12 and setting the value of the variable impedance component 3230 to ensure that the output of the differential amplifier 3210 is negligible in the absence of a field 400. The value of the variable impedance component 3230 may be set during manufacture or testing of the portable device 200, for example using conductive mode stimulus. The optimal input impedance value for the variable impedance component 3230 may be stored in non volatile memory for later use.

The inclusion of the variable impedance component eliminates the component of the phase difference between u'$_{111}$ and u$_{211}$ which is due to the factor:

$$\frac{L_{211b}K_{211b-111}}{L_{111}}, \text{ where } u'_{111} = u_{111}\left[\frac{L_{211b}K_{211b-111}}{L_{111}}\right]$$

and thus reduces the probability of the PLL being driven towards a false equilibrium state.

The component of the phase difference arising due to this factor (described below as an "apparent" component in the phase difference) varies due to manufacturing tolerances etc. in the components of the relevant circuits. Eliminating this "apparent" component of the phase difference prevents synchronisation of the PLL from being impaired and thus also prevents the PLL circuit from being driven towards a false equilibrium.

Referring to FIG. 13, the receiving component 211a may comprise a pair of secondary inductors 211 coupled to a fixed value capacitor 4000 and first and second varactor diodes 5000, 6000. Alternatively, the pair of secondary inductors 211 may be replaced by a single inductor 211 having two symmetrical portions and a centre tap between the portions. The first and second varactor diodes 5000, 6000 are coupled to receive a control signal from the PLL circuit 2000 (e.g. via the control unit 216) and are configured such that the capacitance of the varactor diodes 5000, 6000 varies in response to the output of the PLL circuit 2000. The use of varactor diodes 5000, 6000 provides a means of introducing a continuous range of potential capacitance values for the receiving component 211a, and thus a means of varying the resonant frequency of the receiving component 211a in dependence of the resonant frequency of the supply source 110. Furthermore, the use of varactor diodes 5000, 600 provides an inexpensive and compact means for varying the capacitance of the receiving component 211a. As shown in FIG. 13, this implementation of the receiving component 211a is symmetrical with respect to ground, or a reference potential.

Figure 14:
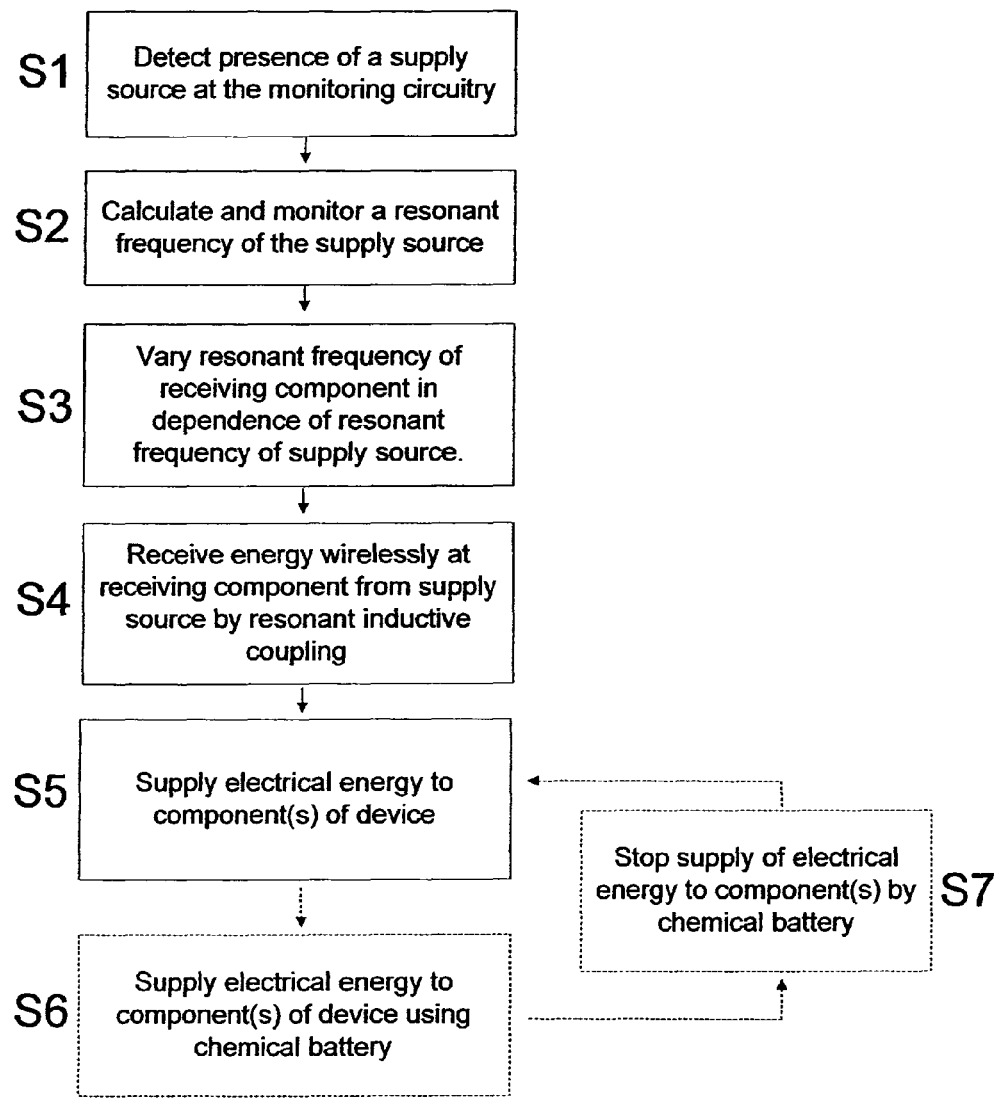
FIG. 14 is a flow diagram showing steps associated with the initiation of wireless power transfer by resonant inductive coupling.

As shown by FIG. 14, the wireless energy transfer apparatus 210 may include a memory 219 for storing frequency values corresponding to resonant frequencies $f_0$ in different environments, such that the resonant frequency associated with the secondary inductor 211 can be automatically adjusted upon the portable electronic device 200 entering a particular environment. For example, such automatic adjustment could be prompted by a control signal, received through an aerial of the portable device 200, indicating that the device 200 has entered a familiar environment. The memory 219 may also be suitable for storing tuning values between various life cycle states. The memory 219 may comprise non-volatile memory in order that the various resonant frequency values $f_0$ stored in the memory 219 are not lost when the device 200 is switched-off.

Steps associated with the initiation of a wireless energy transfer between a supply source 110, for example comprising a primary inductor 111, and the portable electronic device 200 in the manner described above are shown in FIG. 12.

Referring to FIG. 14, as described above, the first step S1 is to detect the presence of the supply source 110 by detecting the presence of its associated magnetic field 400 from an induced voltage at the monitoring circuitry 230. The supply source 110 may comprise a primary inductor 111 in a feeding device 100. The second step S2 is to calculate and monitor the resonant frequency of the supply source 110, and the third step S3 is vary the resonant frequency of the receiving component 211a, comprising the secondary inductor 211, in dependence of the resonant frequency of the supply source 110. In order to initiate wireless energy transfer with the highest possible efficiency, the third step S3 involves matching the resonant frequency of the receiving component 211a with the resonant frequency of the supply source 110. Upon completing these steps, the fourth step S4 is to receive energy wirelessly from the supply source 110 at the receiving component 211a by resonant inductive coupling, and the fifth step S5 is to supply the energy to one or more components 240 of the portable device 200.

If wireless energy transfer between the supply source 110 and portable device 200 stops, for example because the portable device 200 moves out of range, then, as described above, the chemical battery 250 may be configured to supply electrical energy to the components 240 of the portable device 200 in step S6. As shown by FIG. 12, in step S7, the supply of electrical energy from the battery 250 is ceased when wireless energy transfer by resonant inductive coupling is reinitiated.

The above example discusses the use of an adaptive receiving component 211a to vary the resonant frequency associated with the secondary inductor 211 in a portable electronic device 200 so as to match the resonant frequency associated with the secondary inductor 211 to a detected resonant frequency associated with a primary inductor 111 in a feeding device 100. However, it will be appreciated that an adaptive component could alternatively be employed in a feeding device 100 so as match the resonant frequency associated with a primary inductor in the feeding device 100 to that of a secondary inductor in a portable electronic device.

For example, a portable electronic device 200 may be configured to supply a control signal to a feeding device 100 in order to supply the feeding device 100 with the resonance characteristics of the secondary inductor in the portable electronic device. The feeding device 100 would then be able to match the resonant frequency associated with its primary inductor to the resonant frequency associated with the secondary inductor in the portable device 200, thereby initiating wireless energy transfer by resonant inductive coupling.

In another alternative, the supply source of a feeding device may comprise a primary inductor driven by an amplifier, and the microcontroller of the portable electronic device may be configured to match a resonant frequency of the adaptive receiving component to a detected frequency of a magnetic field associated with the supply source.

In the examples discussed above, the portable device 200 comprises a mobile telephone or PDA. However, it will be appreciated that the portable device may alternatively comprise any number of other devices, for example a laptop computer or digital music player. It will further be appreciated that the invention is not limited to the supply of power to portable electronic devices, but may be used for powering a wide variety of other electrical devices. For example, a network of feeding devices may be installed in the home for supplying power to electric lamps and other household appliances. The above-described embodiments and alternatives may be used either singly or in combination to achieve the effects provided by the invention.

The invention claimed is:

1. An apparatus comprising a receiving device adapted to receive energy wirelessly by resonant inductive coupling from a feeding device comprising a supply source, the receiving device comprising:
    monitoring circuitry configured to monitor a resonant frequency of a supply source, the monitoring circuitry comprising a measurement coil;
    a receiving component comprising at least one inductor; and
    a phase locked loop circuit configured to output a control signal based upon signals induced at the inductor and the measurement coil; and
    a control unit configured to vary a resonant frequency of said receiving component in dependence upon the control signal,
wherein the apparatus is configured to match the resonant frequency of said receiving component with the resonant frequency of said supply source.

2. The apparatus according to claim 1, wherein the receiving component is adapted to receive energy wirelessly from the supply source by resonant inductive coupling.

3. The apparatus according to claim 2, wherein the apparatus further comprises a plurality of electrical components, and the apparatus is configured to supply electrical energy to at least one of these electrical components.

4. The apparatus according to claim 3, further comprising a battery for supplying electrical energy to at least one of the electrical components when energy is not being received from the supply source.

5. The apparatus according to claim 1, wherein the receiving component comprises an adaptive receiving component having a variable resonant frequency.

6. The apparatus according to claim 1, wherein a voltage is induced in the receiving component by a magnetic field generated by the supply source, and the control unit is configured to vary the resonant frequency of the receiving component to match the resonant frequency of the supply source.

7. The apparatus according to claim 1, wherein the apparatus comprises a portable electronic device.

8. The apparatus according to claim 1, wherein the apparatus comprises a mobile telephone.

9. The apparatus according to claim 1, wherein the apparatus comprises a personal digital assistant (PDA).

10. The apparatus according to claim 1, wherein the apparatus composes a laptop computer.

11. The apparatus according to claim 1, wherein the receiving component is configured to receive electrical energy by wireless non-radiative energy transfer from the supply source and is configured to supply the received electrical energy to a rechargeable battery.

12. An apparatus comprising a receiving device adapted to receive energy wirelessly by resonant inductive coupling from a feeding device comprising a supply source, the receiving device comprising:
    means for detecting a presence of the supply source;
    means for monitoring a resonant frequency of said supply source, the means for monitoring the resonant frequency comprising a measurement coil;
    a phase locked loop circuit configured to output a control signal based upon signals induced at the measurement coil and at at least one inductor of a receiving component; and
    means for varying a resonant frequency of the receiving component in dependence upon the control signal,
wherein the receiving component comprises an adaptive receiving component having variable resonance characteristics and the apparatus further comprises:
    a control unit configured to automatically vary the resonance characteristics of the adaptive receiving component to match the resonance characteristics of the supply source.

13. An apparatus comprising a receiving device adapted to receive energy wirelessly by resonant inductive coupling from a feeding device comprising a supply source, the receiving device comprising:
    a receiving component having variable resonance characteristics for receiving energy wirelessly from the supply source, the receiving component comprising at least one inductor;
    monitoring circuitry for detecting and monitoring the resonance characteristics of the supply source, the monitoring circuit comprising a measurement coil; and
    a phase locked loop circuit configured to output a control signal based upon signals induced at the inductor and the measurement coil,
    wherein:
    the resonance characteristics of the receiving component is varied in dependence on the control signal to match resonance characteristics of the supply source to increase the efficiency at which energy is received from the supply source;
    the receiving component comprises an adaptive receiving component having variable resonance characteristics; and
    wherein the apparatus further comprises a control unit configured to automatically vary the resonance characteristics of the adaptive receiving component to match the resonance characteristics of the supply source.

14. The apparatus according to claim 13, wherein the apparatus further comprises one or more electrical components and the receiving component is coupled to power supply circuitry to supply power to at least one of these electrical components.

15. The apparatus according to claim 14, further comprising a battery for supplying electrical energy to at least one of the electrical components when energy is not being received from the supply source.

16. The apparatus according to claim 13, wherein the apparatus comprises a portable electronic device.

17. The apparatus according to claim 13, wherein the apparatus comprises a mobile telephone.

18. The apparatus according to claim 13, wherein the apparatus comprises a personal digital assistant (PDA).

19. The apparatus according to claim 13, wherein the apparatus comprises a laptop computer.

20. The apparatus according to claim 13, wherein the receiving component is configured to receive electrical energy by wireless non-radiative energy transfer from the supply source and is configured to supply the received electrical energy to a rechargeable battery.

21. A system comprising:
    a supply source configured to induce a voltage in the adaptive receiving component using a magnetic field generated by the supply source, and
    an apparatus comprising a receiving device adapted to receive energy wirelessly by resonant inductive coupling from the supply source, the receiving device comprising:
        monitoring circuitry configured to monitor a resonant frequency of the supply source, the monitoring circuitry comprising a measurement coil;
        a receiving component comprising at least one inductor;
        a phase locked loop circuit configured to output a control signal based upon signals induced at the inductor and the measurement coil; and
        a control unit configured to vary a resonant frequency of said receiving component in dependence upon the control signal, wherein said receiving component comprises an adaptive receiving component having a variable resonant frequency,
wherein the apparatus is configured to vary the resonant frequency of the adaptive receiving component to match the resonant frequency of the supply source.

22. A method comprising:
    detecting a presence of a supply source of a feeding device;
    monitoring a resonant frequency of said supply source using monitoring circuitry of a receiving device adapted to receive energy wirelessly by resonant inductive coupling from the supply source, the monitoring circuitry comprising a measurement coil;
    outputting, from a phase locked loop circuit of the receiving device, a control signal based upon signals induced at the measurement coil and at at least one inductor of a receiving component of the receiving device, said receiving component comprising an adaptive receiving component having a variable resonant frequency; and
    varying a resonant frequency of the receiving component in dependence upon the control signal, said method further comprising:
    inducing a voltage in the adaptive receiving component using a magnetic field generated by the supply source; and
    varying the resonant frequency of the adaptive receiving component to match the resonant frequency of the supply source.

23. The method according to claim 22, further comprising:
    matching the resonant frequency of said receiving component with the resonant frequency of said supply source.

24. The method according to claim 22, further comprising:
    receiving energy wirelessly at the receiving component from the supply source by resonant inductive coupling.

25. The method according to claim 22, further comprising supplying electrical energy to an electrical apparatus.

26. The method according to claim 22, further comprising:
    receiving energy at the receiving component from the supply source by resonant inductive coupling,
    supplying energy received by resonant inductive coupling to at least one component of an electrical device; and supplying energy to at least one component of an electrical device from a battery when energy is not being received at the receiving component from the supply source.

27. The method according to claim 22, further comprising receiving electrical energy at the receiving component by wireless non-radiative energy transfer from the supply source and supplying the received electrical energy to a rechargeable battery.

28. A computer program product comprising a non-transitory computer readable storage-medium having computer executable program code stored thereon which, when executed by a processor, causes an apparatus to perform:
  detecting a presence of a supply source;
  monitoring a resonant frequency of said supply source using monitoring circuitry of a receiving device adapted to receive energy wirelessly by resonant inductive coupling from the supply source, the monitoring circuitry comprising a measurement coil;
  outputting, from a phase locked loop circuit of the receiving device, a control signal based upon signals induced at the measurement coil and at at least one inductor of a receiving component of the receiving device;
  varying a resonant frequency of the receiving component in dependence upon the control signal; and
  matching the resonant frequency of said receiving component with the resonant frequency of said supply source.

\* \* \* \* \*